United States Patent
Yokoyama et al.

(10) Patent No.: US 12,541,207 B2
(45) Date of Patent: Feb. 3, 2026

(54) AUTOMATIC DRIVING SYSTEM FOR MANAGING PRIORITY AND CONTROLLING TRANSPORT OF A PLURALITY OF VEHICLES FROM PRODUCTION TO SHIPMENT

(71) Applicant: TOYOTA JIDOSHA KABUSHIKI KAISHA, Toyota (JP)

(72) Inventors: Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 18/427,271

(22) Filed: Jan. 30, 2024

(65) Prior Publication Data
US 2024/0310844 A1 Sep. 19, 2024

(30) Foreign Application Priority Data

Mar. 14, 2023 (JP) .................................. 2023-039416
Oct. 10, 2023 (JP) .................................. 2023-175217

(51) Int. Cl.
| | | |
|---|---|---|
| G05D 1/225 | (2024.01) | |
| G05D 1/698 | (2024.01) | |
| G05D 105/45 | (2024.01) | |

(52) U.S. Cl.
CPC ............. *G05D 1/225* (2024.01); *G05D 1/698* (2024.01); *G05D 2105/45* (2024.01)

(58) Field of Classification Search
CPC ..... G05D 1/225; G05D 1/698; G05D 2105/45
See application file for complete search history.

(56) References Cited

U.S. PATENT DOCUMENTS

| | | | | |
|---|---|---|---|---|
| 8,145,368 | B2* | 3/2012 | Won | G08G 1/01 |
| | | | | 701/119 |
| 8,682,511 | B2* | 3/2014 | Andreasson | B61L 27/20 |
| | | | | 701/19 |
| 10,286,913 | B2* | 5/2019 | Saigusa | B60W 30/0956 |
| 11,640,580 | B2* | 5/2023 | Rorro | G06Q 10/0838 |
| | | | | 705/29 |
| 2005/0216180 | A1* | 9/2005 | Heinrichs-Bartscher | ..................... |
| | | | | B60K 31/0066 |
| | | | | 701/1 |

(Continued)

FOREIGN PATENT DOCUMENTS

JP 2017-538619 A 12/2017

*Primary Examiner* — Ramsey Refai
(74) *Attorney, Agent, or Firm* — Sughrue Mion, PLLC

(57) ABSTRACT

An automatic driving system allows a vehicle with a higher shipment priority to be transported preferentially, by controlling transport of each of several vehicles in any of steps from production to shipment includes: a priority acquisition unit configured to acquire a shipment priority set for each vehicle; and a control instruction unit configured to determine control content for at least some of the vehicles using the priority acquired by the priority acquisition unit such that a vehicle of the several vehicles that is given a first priority is transported in preference to another vehicle of the several vehicles that is given a second priority lower than the first priority, and to instruct the at least some of several vehicles on the control content. Each vehicle includes a driving control unit configured to execute driving control according to instructions from the control instruction unit.

7 Claims, 9 Drawing Sheets

(56) References Cited

U.S. PATENT DOCUMENTS

| | | | |
|---|---|---|---|
| 2011/0125350 A1* | 5/2011 | Won | B61L 15/0072 |
| | | | 701/20 |
| 2011/0184596 A1* | 7/2011 | Andreasson | B61L 27/04 |
| | | | 701/19 |
| 2017/0320529 A1 | 11/2017 | Nordbruch | |
| 2019/0164128 A1* | 5/2019 | Millhouse | H04L 67/12 |
| 2020/0042019 A1 | 2/2020 | Marczuk et al. | |
| 2020/0273133 A1* | 8/2020 | Morris | G06Q 10/08 |

* cited by examiner

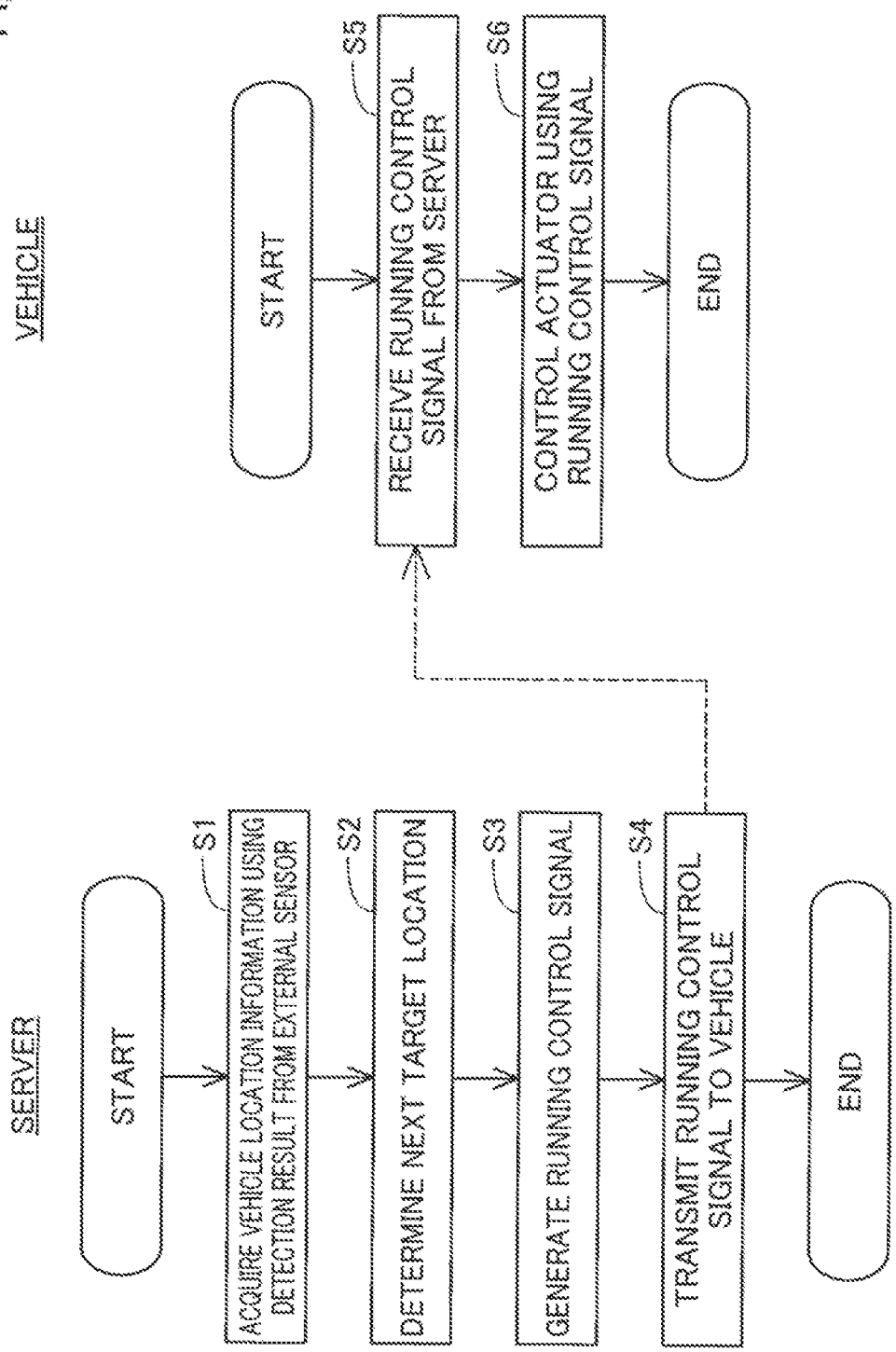

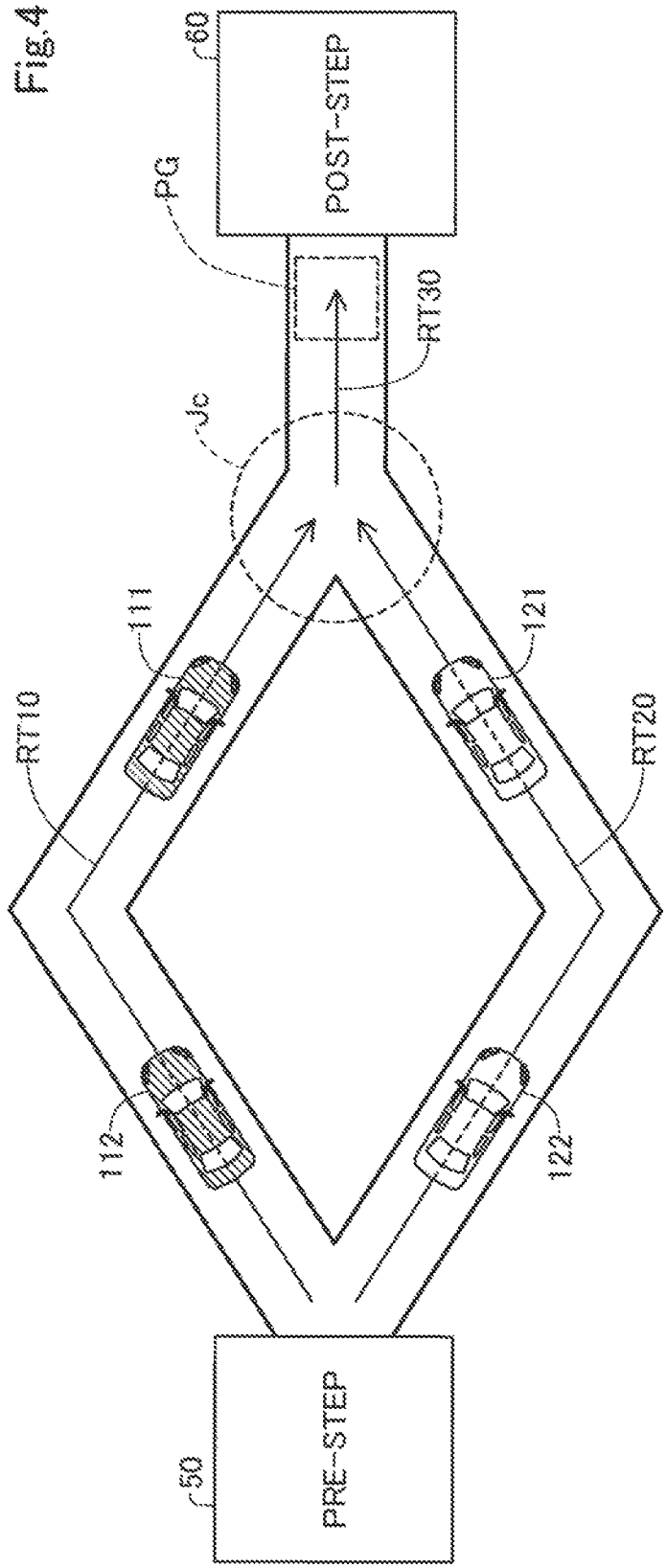

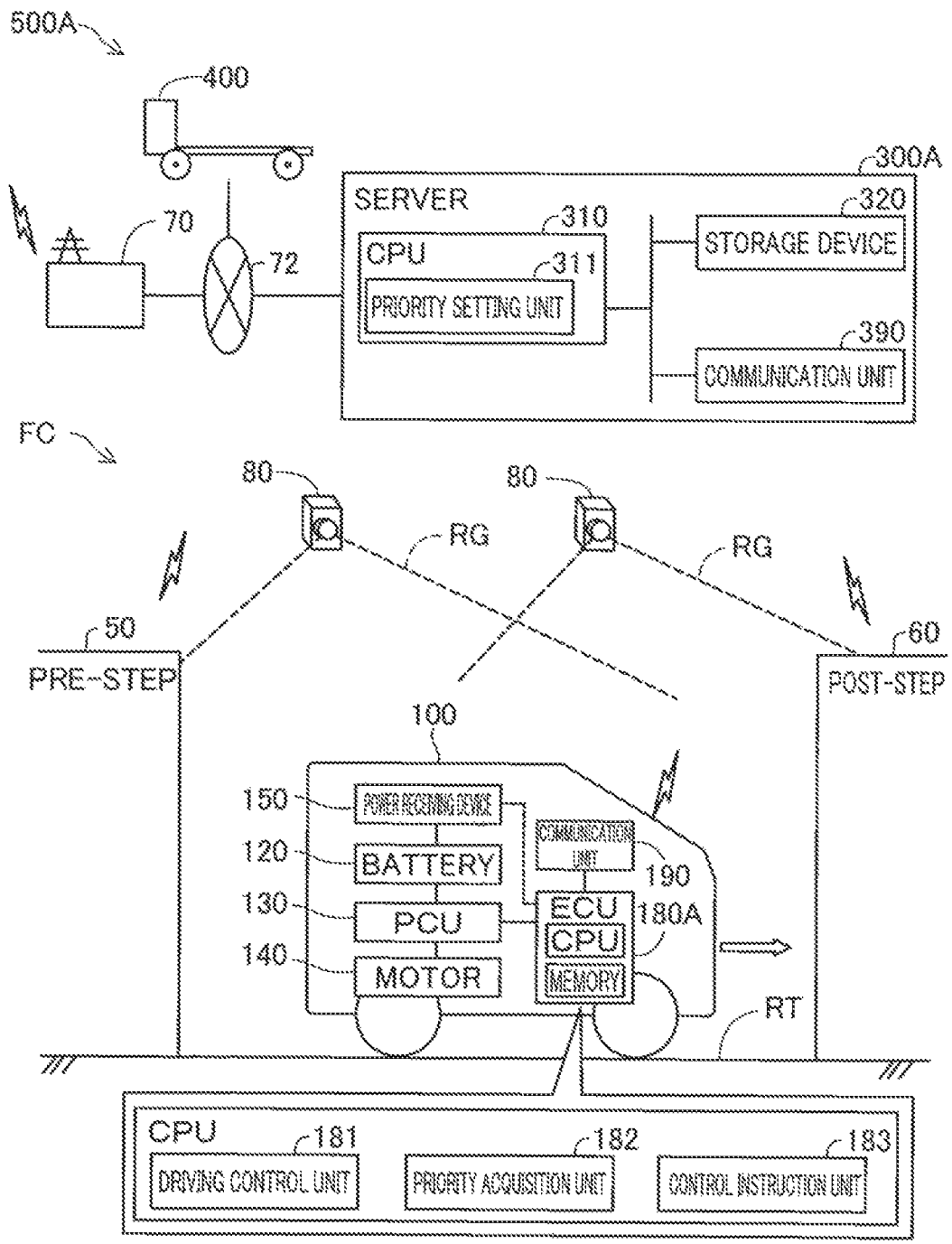

AUTOMATIC DRIVING SYSTEM FOR MANAGING PRIORITY AND CONTROLLING TRANSPORT OF A PLURALITY OF VEHICLES FROM PRODUCTION TO SHIPMENT

CROSS-REFERENCE TO RELATED APPLICATIONS

This patent application claims priority based upon Japanese patent application No. 2023-039416, filed on Mar. 14, 2023 and Japanese patent application No. 2023-175217, filed on Oct. 10, 2023, the entire disclosure of which is incorporated herein by reference.

BACKGROUND

Field

The present disclosure relates to an automatic driving system, a server, and a vehicle.

Related Art

For efficient operation of a manufacturing system for producing vehicles, a vehicle running method is known where vehicles are caused to run from an end of an assembly line of the manufacturing system to a parking facility within the manufacturing system by remote control or the like (e.g., Japanese Unexamined Patent Application Publication (Translation of PCT Application) No. 2017-538619).

In a manufacturing factory that manufactures vehicles, a problem may arise as to which vehicle should be transported preferentially in transporting multiple vehicles. For example, when multiple routes are used to transport vehicles, vehicles that have been transported on different routes may meet at a point where the multiple routes converge, so that a problem may arise as to which vehicle should be passed first. Such problems may occur not only in the manufacturing factory, but also outside the factory during vehicle transport for shipment.

SUMMARY

According to an aspect of the present disclosure, an automatic driving system is provided. The automatic driving system is an automatic driving system for controlling transport of each of a plurality of vehicles in any of steps from production to shipment and comprises: a priority acquisition unit configured to acquire a shipment priority that is set for each of the plurality of vehicles; and a control instruction unit configured to determine control content for at least some of the plurality of vehicles using the priority acquired by the priority acquisition unit such that a vehicle of the plurality of vehicles that is given a first priority as the priority is transported in preference to another vehicle of the plurality of vehicles that is given a second priority as the priority, the second priority being lower than the first priority, and to instruct the at least some of the plurality of vehicles on the control content. Each of the plurality of vehicles includes a driving control unit configured to execute driving control of the vehicle according to instructions from the control instruction unit.

BRIEF DESCRIPTION OF THE DRAWINGS

FIG. 3B is a flowchart of a procedure for running control according to the first embodiment;

FIG. 4 illustrates an example of how vehicles are transported by the transport arbitration control;

FIG. 5 illustrates a schematic configuration of an automatic driving system according to a second embodiment;

DETAILED DESCRIPTION

A. First Embodiment

A-1. System Configuration

Figure 1:
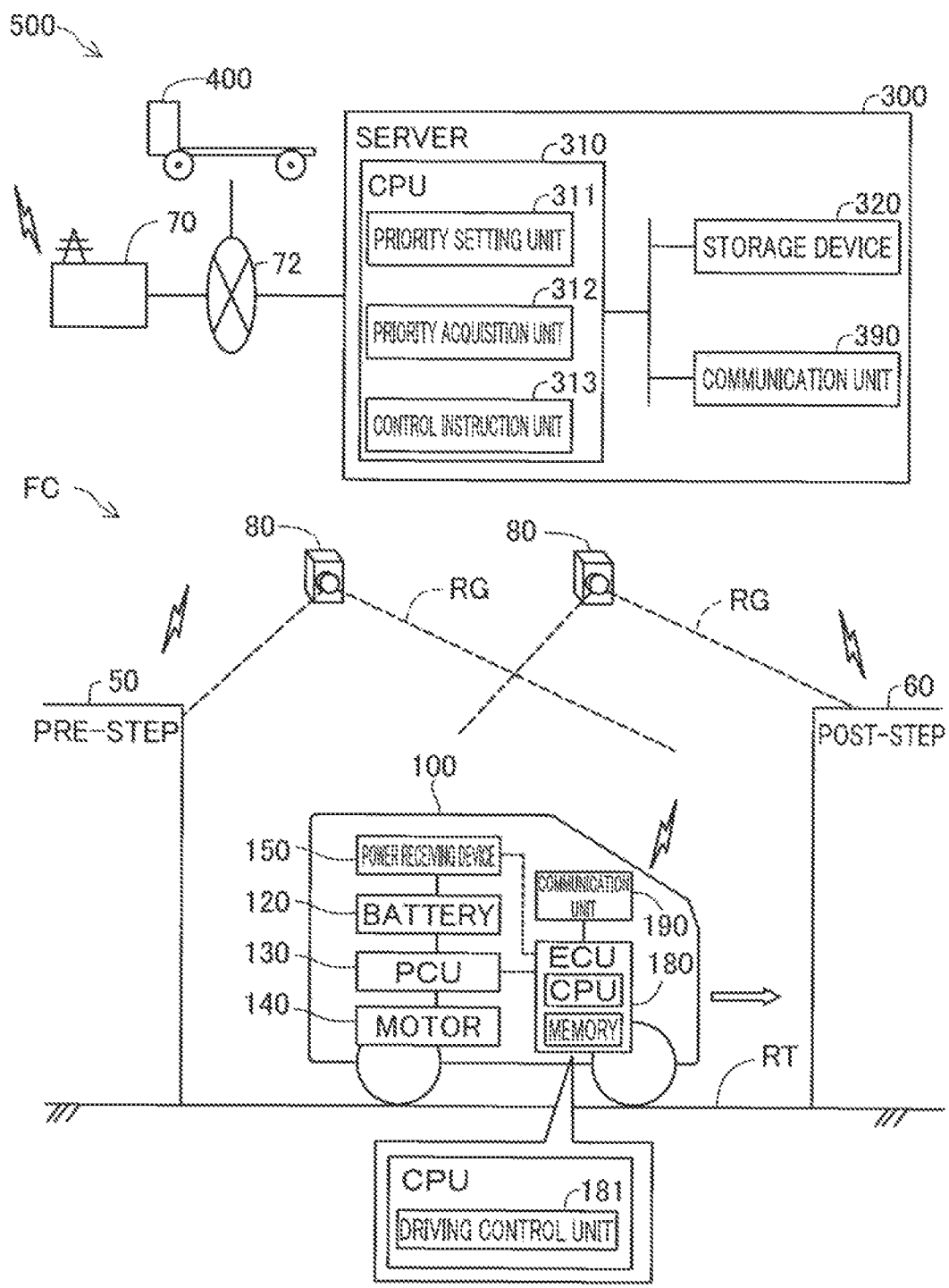
FIG. 1 illustrates a schematic configuration of an automatic driving system according to a first embodiment.

FIG. 1 illustrates a schematic configuration of an automatic driving system 500 according to a first embodiment. The automatic driving system 500 controls automatic driving of a vehicle 100 as an example of the "moving object" by remote control. Specifically, the automatic driving system 500 uses remote control to cause the vehicle 100 to automatically run during manufacturing steps in a factory FC that manufactures the vehicle 100. In the present embodiment, the vehicle 100 is configured to be capable of running by unmanned driving. In the present embodiment, the vehicle 100 is, for example, a passenger car, truck, bus, or construction vehicle. As used herein, the term "vehicle" collectively refers to finished products, and semi-finished or in-process products that are being manufactured. The target for remote control by the automatic driving system 500 is not limited to the vehicle 100 being manufactured in the factory FC, but may also include logistics carts operating in the factory FC.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board the vehicle 100 running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As shown in FIG. 1, the factory FC includes a pre-step 50, a post-step 60, a track RT for the vehicle 100, and a vehicle detector. The track RT is a transport section for the vehicle 100 in the factory FC that connects the pre-step 50 and the post-step 60. The factory FC is not limited to being a single building or residing at a single site or address; for example, steps during manufacturing may reside over multiple buildings, multiple sites, multiple addresses, etc. The phrase "in the factory FC" also includes areas ranging from a place where the vehicle 100 is finished to a waiting place where the finished vehicle 100 is loaded onto a loading vehicle 400 for shipment. The phrase "the vehicle 100 runs in the factory FC" encompasses a case where the vehicle 100 runs in a transport section between steps residing at multiple locations, such as on the track RT, a case where the vehicle 100 runs only within a step, and a case where the vehicle 100 runs on public roads, as well as on private roads, between factories in order to, for example, move between the factories residing at multiple locations.

The pre-step 50 is, for example, an assembly step of assembling parts onto a vehicle body. The post-step 60 is, for example, an inspection step for the vehicle 100. The vehicle 100 dispatched from the pre-step 50 becomes an in-process product for the post-step 60 and runs on the track RT to the running destination, the post-step 60. The vehicle 100 enters the post-step 60 upon acquiring permission for entering the post-step 60. Following the inspection step as the post-step 60, the vehicle 100 is finished as a product and runs to a waiting place in the factory FC to wait for shipment. The vehicle 100 is then loaded onto the loading vehicle 400 and shipped to a corresponding shipping destination for each vehicle 100.

The steps in the factory FC including the pre-step 50 and the post-step 60 each include a step management device to manage manufacturing information about the vehicle 100. The "manufacturing information" includes, for example, the progress of processing in each step, the number of in-process products, the number of products being processed, manufacturing time per step, start and completion times of processing in each step, vehicle identification information for vehicles 100 present in each step, the number of vehicles scheduled to be manufactured per day, target production time for the steps to produce one vehicle 100. The target production time is sometimes referred to as "takt time." The "vehicle identification information" refers to various kinds of information that can identify individual vehicles 100. The vehicle identification information includes, for example, ID information predetermined for each vehicle 100, specification information such as vehicle type, color, shape, etc. of the vehicle 100, and production management information such as the name of the step in progress for the vehicle 100 and the shipping destination. For example, the vehicle identification information can be acquired from a radio frequency-identification (RF-ID) tag attached to the vehicle 100. When multiple vehicles 100 are manufactured in groups, such as in lots, the lot number or the like can be used as vehicle identification information. The vehicle identification information may also be location information about the vehicle 100 in the factory FC, such as coordinates on the track RT or coordinates in the factory FC. The step control device for each step acquires the manufacturing information about the vehicle 100 in each step from cameras and sensors (not shown) provided for each step and transmits the acquired manufacturing information to a server 300. The manufacturing information for each step may be transmitted to a production management device that centrally manages the manufacturing information for each step in the factory FC. Note that the pre-step 50 and the post-step 60 are not limited to the assembly and inspection steps, and may employ any of various steps, provided that the vehicle 100 after passing through the processing in the pre-step 50 and the post-step 60 can run by remote control.

The vehicle detector is used to detect the position and orientation of the vehicle 100. In the present embodiment, cameras 80 are used as vehicle detectors. The cameras 80 are fixed at positions where they can capture images of the track RT and the running vehicle 100. The cameras 80 acquire images from which the position of the vehicle 100 relative to the track RT can be confirmed. The images captured by the cameras 80 are used for remote control of the vehicle 100. The use of the images captured by the cameras 80 enables automatic running of the vehicle 100 by remote control, without using detectors mounted on the vehicle 100, such as a camera, millimeter wave radar, and LiDAR. However, detectors mounted on the vehicle 100 may be additionally used to prevent collisions during remote control by the automatic driving system 500. The vehicle detector may be any of various kinds of detectors other than the camera 80 that can detect the vehicle 100, such as an infrared sensor, laser sensor, ultrasonic sensor, millimeter wave radar, and LiDAR, provided that the vehicle detector is installed in the factory FC and can acquire the position and orientation of the vehicle 100.

The automatic driving system 500 includes multiple vehicles 100 and the server 300. In the present embodiment, the automatic driving system 500 uses information received from the loading vehicle 400 to control the automatic driving of the vehicles 100. In FIG. 1, only one of the multiple vehicles 100 is shown with the other vehicles 100 omitted.

The vehicle 100 in the present embodiment is configured as an electric vehicle and includes a communication unit 190, a power receiving device 150, a battery 120, a PCU 130, a motor 140, and an electronic control unit (ECU) 180. Note that the vehicle 100 is not limited to an electric vehicle and may be configured as, for example, a gasoline vehicle, hybrid vehicle, or fuel cell vehicle.

The communication unit 190 is a wireless communication device mounted on the vehicle 100, such as a dongle. The communication unit 190 has a communication function to communicate using controller area network (CAN) communication, which can be used for control etc. of the vehicle 100, and diagnosis communication, which can be used for failure diagnosis etc. The CAN communication is a communication standard that enables multi-directional transmission or reception. The diagnosis communication is a communication standard that enables one-to-one correspondence between requests and responses. The communication unit 190 may also communicate using other communication standards such as Wi-Fi (registered trademark), 5th generation mobile communication system (5G), and Long Term Evolution (LTE). The communication unit 190 is configured to be capable of remotely communicating with an external device of the vehicle 100 via, for example, an access point 70 in the factory FC. The external device of the vehicle 100 is, for example, the server 300 connected to a network 72, an unillustrated production management device that generally manages production management information on the vehicle 100, or the other vehicle 100. In the present embodiment, the communication unit 190 receives control signals for remote control of the vehicles 100 from the server 300, as described below. The communication unit 190 corresponds to the "information acquisition unit" in the present disclosure.

The power receiving device 150 converts AC power supplied from an external power supply device or the like to DC power by means of a rectifier and supplies it to the battery 120 as a load. For example, the battery 120 is a rechargeable secondary battery such as a lithium-ion battery or nickel-metal hydride battery. For example, the battery 120 is a high-voltage battery of several hundred volts and stores power used for running of the vehicle 100. The battery 120 is charged upon being supplied with power supplied from an external power supply device to the power receiving device 150 and regenerative power generated by the motor 140.

The motor 140 is, for example, an AC synchronous motor and functions as an electric motor and power generator. When the motor 140 functions as an electric motor, the motor 140 is driven by the power stored in the battery 120. The output of the motor 140 is transmitted to wheels via reduction gears and an axle. When the vehicle 100 slows down, the motor 140 functions as a power generator that utilizes rotation of the wheels to generate regenerative power. A power control unit (PCU) 130 is electrically connected between the motor 140 and the battery 120.

The PCU 130 includes an inverter, a boost converter, and a DC/DC converter. The inverter converts DC power supplied from the battery 120 to AC power and supplies the converted AC power to the motor 140. The inverter converts the regenerative power supplied by the motor 140 to DC power and supplies it to the battery 120. The boost converter boosts the voltage of the battery 120 when the power stored in the battery 120 is supplied to the motor 140. The DC/DC converter steps down the voltage of the battery 120 when the power stored in the battery 120 is supplied to auxiliary machines, etc.

The ECU 180 is mounted on the vehicle 100 and executes various types of control of the vehicle 100. The ECU 180 includes a memory such as an HDD, optical recording media, or semiconductor memory, and a central processing unit (CPU). In the present embodiment, the CPU functions as a driving control unit 181 by executing various computer programs stored in the memory. The driving control unit 181 executes driving control of the vehicle 100. The term "driving control" refers to, for example, adjusting the acceleration, speed, and steering angle of the vehicle 100.

The loading vehicle 400 loads and carries vehicles 100 with a predetermined vehicle attribute. The term "vehicle attribute" refers to a predetermined attribute of each of the multiple vehicles, such as shipping destination, body color and grade of each vehicle 100. In the present embodiment, the loading vehicle 400 is configured to be capable of managing the current number of vehicles 100 loaded. The loading vehicle 400 can manage the current number of vehicles 100 loaded by, for example, detecting the loaded weight using a weight sensor installed on the loading bed, or by analyzing images captured by a camera installed on the loading bed. The loading vehicle 400 can use the information about a predetermined number of vehicles that can be loaded and the current number of vehicles loaded to further manage its loading capacity, which indicates how many more vehicles 100 can be loaded. In the present embodiment, the loading vehicle 400 transmits standby information indicating whether it is on standby or not and loading capacity information indicating its loading capacity to the server 300 via the network 72. The standby information and the loading capacity information correspond to the "information about a current status of shipment of the plurality of vehicles" in the present disclosure. The standby information and the loading capacity information are, for example, periodically transmitted to the server 300 at predetermined time intervals by an ECU (not shown) of the loading vehicle 400. Alternatively, the standby information and the loading capacity information may be transmitted to the server 300 at any timing, for example, in response to a driver of the loading vehicle 400 operating a communication terminal such as a smartphone.

The server 300 includes a central processing unit (CPU) 310, a storage device 320, and a communication unit 390, which are interconnected via an internal bus, interface circuitry, etc. The communication unit 390 is configured to be capable of remotely communicating with the vehicles 100, the loading vehicle 400, etc. via the network 72.

The storage device 320 is, for example, a RAM, ROM, hard disk drive (HDD), solid state drive (SSD), or the like. The storage device 320 stores the manufacturing information about each vehicle 100 transmitted from the step management device for each step and manages the manufacturing information for each vehicle 100. In the present embodiment, the CPU 310 functions as a priority setting unit 311, a priority acquisition unit 312, and a control instruction unit 313 as the CPU 310 executes computer programs stored in the storage device 320. Note that some or all of these functions may be implemented by hardware circuitry.

In response to receiving the standby information and the loading capacity information from the loading vehicle 400, the priority setting unit 311 uses such information to set a shipment priority of the vehicle 100. In the present embodiment, the priority acquisition unit 312 acquires the priority of the vehicle 100 that is determined by the priority setting unit 311.

The control instruction unit 313 executes automatic running of the vehicle 100 in the factory FC by remote control. More specifically, the control instruction unit 313 transmits a control signal indicating control content for the vehicle 100 to the vehicle 100 via the communication unit 390. In response to the vehicle 100 receiving the control signal, the driving control unit 181 implements the driving control according to the control signal, thereby causing the vehicle 100 to run automatically. The transportation of the vehicle 100 using automatic running by remote control is also referred to as a "Remote Control auto Driving system." The Remote Control auto Driving system for the vehicle 100 can reduce or prevent human-caused accidents during running of the vehicle 100. In response to receiving the standby information and the loading capacity information from the loading vehicle 400, the control instruction unit 313 uses the acquired priority to determine the control content for at least some of the multiple vehicles 100 such that a higher prioritized vehicle 100 of multiple vehicles 100 is transported preferentially.

Figure 2:
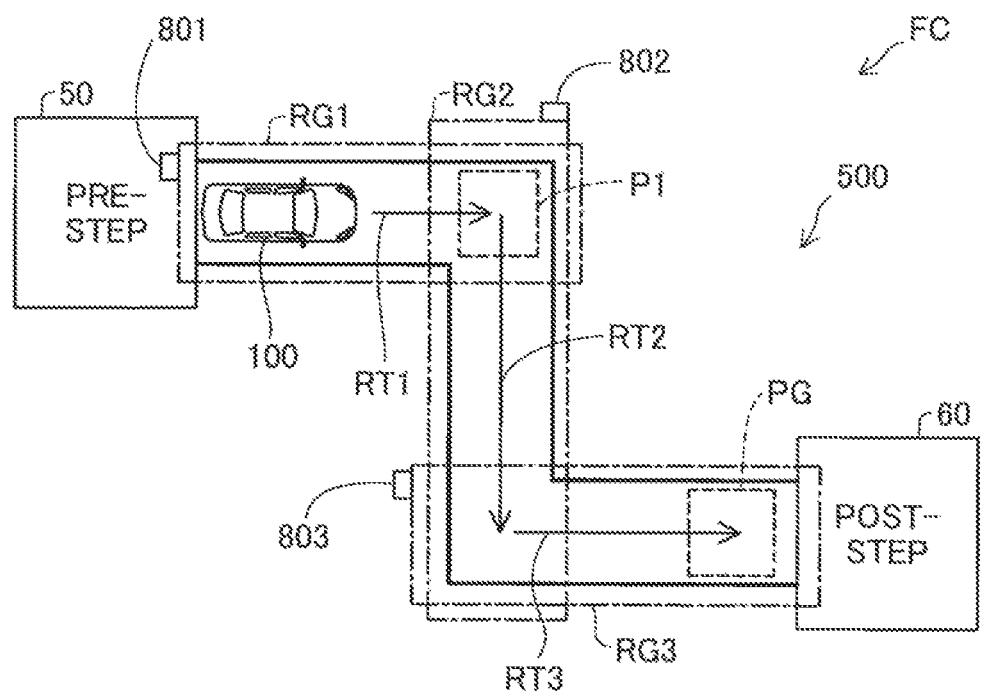
FIG. 2 illustrates control of automatic driving of a vehicle by remote control.

FIG. 2 illustrates control of automatic driving of the vehicle 100 by remote control. In the example of FIG. 2, the track RT includes a first track RT1, a second track RT2, and a third track RT3 continuous with each other. The control notification unit 313 causes the vehicle 100 to run to a position PG for entering the post-step 60 along the track RT. While in the example in FIG. 2, the pre-step 50 and the post-step 60 are connected with a series of tracks without intermediate branches, the track connecting the pre-step 50 and the post-step 60 may diverge into multiple tracks on the way that then converge again, as described below.

The cameras 80 as the vehicle detectors acquire images of the track RT from above. The number of cameras 80 is set to allow for capturing the entire track RT by taking into account the angles of view of the cameras 80 and other factors. In the example in FIG. 2, the cameras 80 include a camera 801 capable of capturing a range RG1 including the entire first track RT1, a camera 802 capable of capturing a range RG2 including the entire second track RT2, and a camera 803 capable of capturing a range RG3 including the entire third track RT3. The cameras 80 may acquire images from the front, behind, or the side of the vehicle 100, rather than from above the vehicle 100. Also, the cameras that acquire these images may be combined in any combination.

The track RT has a predetermined target route along which the vehicle 100 should run. The control instruction unit 313 causes the driving control unit 181 to execute driving control of the vehicle 100 while analyzing images of the track RT and the vehicle 100, acquired by the cameras 80, at predetermined time intervals. The vehicle 100 can run along the target route as the control instruction unit 313 consecutively adjusts the relative position of the vehicle 100 with respect to the target route. Note that the remote control may use images of the entire vehicle 100 or images of a portion of the vehicle 100, such as an alignment mark on the vehicle 100.

The angles of view of the cameras 80 corresponding the respective connected tracks are set to overlap each other at a junction of the respective tracks, such as at a position P1 shown in FIG. 2. In the example of the position P1, the angle of view of the camera 801 corresponding to the first track RT1 and the angle of view of the camera 802 corresponding to the second track RT2 overlap each other. The vehicle 100 dispatched from the pre-step 50 is caused to run to the position P1 by remote control using the images captured by the camera 801. Upon reaching the position P1, the remote control switches to using the images captured by the camera 802 instead of the camera 801 to cause the vehicle 100 to run on the second track RT2. Similarly, the images captured by the camera 803 are used for running on the third track RT3. In this way, the control instruction unit 313 executes remote control of the vehicle 100 while appropriately switching the captured images to be analyzed for each range of the track RT.

A-2. Transport Arbitration Control

Figure 3A:
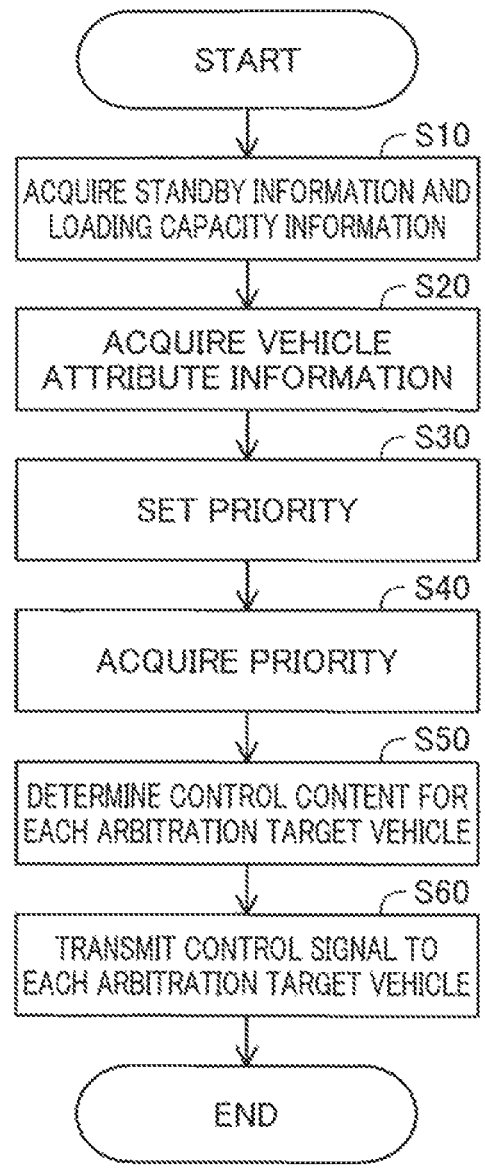
FIG. 3A is a flowchart of a procedure for transport arbitration control according to the first embodiment.

FIG. 3A is a flowchart of a procedure for transport arbitration control according to the first embodiment. FIG. 3B is a flowchart of a procedure for running control according to the first embodiment. FIG. 4 illustrates an example of how vehicles are transported by the transport arbitration control. In the present embodiment, the server 300 executes the transport arbitration control in response to receiving the standby information and the loading capacity information from the loading vehicle 400. The server 300 executes the transport arbitration control for multiple vehicles 100 (hereinafter also referred to as "arbitration target vehicles") running along multiple different tracks as shown in FIG. 4. Note that the server 300 remotely controls each vehicle 100 to run at a predetermined default speed and on a predetermined route while the server 300 is not executing the transport arbitration control. The running control is a control on which the transport arbitration control is based. In other words, the running control is executed as the basic control, and the transport arbitration control is executed in combination with such running control. First, the running control is described with reference to FIG. 3B.

As shown in FIG. 3B, in step S1, the server 300 acquires vehicle location information of the vehicle 100 using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera 80 as a vehicle detector that is disposed in the factory and outputs a captured image as detection result. In step S1, the server 300 acquires the vehicle location information using the captured image acquired from the camera 80 as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the automatic driving system 500 or outside the automatic driving system 500. The detection model is stored in advance in the storage device 320 of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 300 or a region indicating a subject other than the vehicle 100, for example. In training the CNN, a parameter for the CNN is preferably updated through backpropagation in such a manner as to reduce error between output result obtained by the detection model and the label. The server 200 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The storage device 320 of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal (also referred to simply as "control signal") for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 200 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the automatic driving system 500 in the present embodiment, it becomes possible to move the vehicle 100 without using a transport unit such as a crane or a conveyor. Note that the functions of the server 300 to implement the running control described above may be provided by another device different from the server 300. In other words, the above-described functions of the server to implement the running control may be provided by a device that is different from the device (server 300) having the function of setting and acquiring the priority.

As shown in FIG. 4, the pre-step 50 and the post-step 60 are connected with a track RT10, a track RT20, a converging point Jc, and a track RT30. The tracks RT10 and RT20 diverge from the pre-step away from each other and converge at the converging point Jc, which is enclosed by a dashed line. The track RT30 connects the converging point Jc and the post-step 60. Note that the number of tracks that converge at the converging point Jc is not limited to two, and three or more tracks may converge at the converging point Jc.

In FIG. 4, a vehicle 111 and a vehicle 112, shown in a hatched manner, are running on the track RT10, and a vehicle 121 and a vehicle 122, shown in an unhatched manner, are running on the track RT20. The vehicle 111 and the vehicle 112 have a vehicle attribute A, and the vehicle 121 and the vehicle 122 have a vehicle attribute B, which is a different vehicle attribute from the vehicle attribute A. The vehicle 111, the vehicle 112, the vehicle 121, and the vehicle 122 correspond to the arbitration target vehicles described above. Note that while in the example shown in FIG. 4, the vehicle 111 and the vehicle 112 having the vehicle attribute A are running on the track RT10 and the vehicle 121 and the vehicle 122 having the vehicle attribute B are running on the track RT20, multiple vehicles 100 having different vehicle attributes from each other may be running together on each of the track RT10 and the track RT20.

The transport arbitration control is described with reference to FIG. 3A. In step S10 shown in FIG. 3A, the priority setting unit 311 acquires the standby information and the loading capacity information received from the loading vehicle 400. In step S20, the priority setting unit 311 acquires vehicle attribute information indicating vehicle attributes of each arbitration target vehicles. The vehicle attribute information is acquired by, for example, identifying a vehicle 100 running on the track RT via an analysis of the images captured by the cameras 80 installed on the track RT and matching the ID information corresponding to that vehicle 100 against the manufacturing information stored in the memory. When information indicating only vehicle attributes that can be identified from the external appearance, such as vehicle type and body color, is to be acquired as the vehicle attribute information, the vehicle attribute information may be acquired only via an analysis of the images captured by the cameras 80, without using the manufacturing information.

In step S30, the priority setting unit 311 sets a priority of each arbitration target vehicle using the acquired standby information, loading capacity information, and vehicle attribute information. In the example shown in FIG. 4, it is assumed that the priority setting unit 311 acquires, as the standby information, information indicating that the loading vehicle 400 transporting vehicles 100 with the vehicle attribute A is on standby, and acquires, as the loading capacity information, information indicating that the loading vehicle 400 can load one more vehicle 100 with the vehicle attribute A. In this case, the priority setting unit 311 sets a higher priority for the vehicle 111 over the vehicle 112, the vehicle 121, and the vehicle 122. The vehicle 111 that is given a higher priority over the vehicle 112, the vehicle 121, and the vehicle 122 corresponds to the "priority vehicle" in the present disclosure. In this manner, the priority setting unit 311 uses the loading capacity information and the vehicle attribute information to set an upper limit of priority vehicles and determines the priority such that the number of priority vehicles is less than or equal to the set limit. Setting the priority in this manner can reduce delay in transporting vehicles 100 other than the priority vehicles that may otherwise result from transporting the priority vehicles in excess of the loading capacity of the loading vehicle.

In step S40 shown in FIG. 3A, the priority acquisition unit 312 acquires the priority from the priority setting unit 311. In step S50, the control instruction unit 313 determines the control content for each arbitration target vehicle using the priority acquired by the priority acquisition unit 312.

In the example shown in FIG. 4, the vehicle 111 and the vehicle 121 are at about the same distance to the converging point Jc and thus expected to meet at the converging point Jc if they run at the same speed. In the present embodiment, the term "meet" means that multiple vehicles 100 reach the converging point Jc within a predetermined time interval. If multiple vehicles 100 meet at the converging point Jc and run further to enter the converging point Jc, they may collide with each other. Accordingly, in the present embodiment, at least one of the vehicle 111 and the vehicle 121 stops or slows down to avoid such a collision. Thus, if the vehicle 111 and the vehicle 121 are predicted to meet at the converging point Jc, the control instruction unit 313 determines to increase the vehicle speed of the vehicle 111, which has a higher priority than the vehicle 121, as the control content for the vehicle 111. In addition, the control instruction unit 313 determines to decrease the vehicle speed of the vehicle 121, which has a lower priority than the vehicle 111, as the control content for the vehicle 121. Note that the phrase "decrease the vehicle speed" has a broad meaning, referring not only to slowing down the vehicle 121 to a predetermined speed but also to stopping the vehicle 121. The control instruction unit 313 may cause execution of only one of the control to increase the vehicle speed of the vehicle 111 and the control to decrease the vehicle speed of the vehicle 121. Such control corresponds to the "pre-arbitration control" in the present disclosure. Executing the pre-arbitration control allows the vehicle 111, which has a higher priority than the vehicle 121, to preferentially pass though the converging point Jc. In addition, this can reduce situations where the vehicle 111 and the vehicle 122 meet at the converging point Jc and are both forced to stop or slow down, and thus can restrain an increase in transport time for the vehicle 111 and the vehicle 121 that may otherwise be caused by such stop or slow down.

Also, if the vehicle 111 and the vehicle 121 meet at the converging point Jc, the control instruction unit 313 executes a control to allow the vehicle 111, which has a higher priority than the vehicle 121, to preferentially pass through the converging point Jc. Such control corresponds to the "post-arbitration control" in the present disclosure. For example, such a case may occur between the vehicle 111, following a vehicle that has been running ahead of the vehicle 111 (hereinafter also referred to as a "preceding vehicle"), and the vehicle 121 after the above pre-arbitration control is executed on the preceding vehicle and the vehicle 121 to avoid them from meeting. Even in such a case, executing the pre-arbitration control allows the vehicle 111, which has a higher priority than the vehicle 121, to preferentially pass through the converging point Jc. If multiple vehicles 100 having the same priority meet at the converging point Jc, the control instruction unit 313 may determine the control content such that a vehicle 100 that has reached the converging point Jc earlier, even slightly, is allowed to preferentially pass through the converging point Jc.

In step S60, the control instruction unit 313 transmits a control signal indicating the determined control content to each arbitration target vehicle. The driving control unit 181 of each arbitration target vehicle executes the driving control of its own vehicle according to the control signal from the control instruction unit 313. This completes the transport arbitration control of the present embodiment.

The automatic driving system 500 of the first embodiment described above uses the priority to determine control content for at least some of the multiple vehicles 100 such that a higher prioritized vehicle 100 of the multiple vehicles is transported preferentially, and instructs these at least some vehicles on the control content. This can clarify which of the multiple vehicles 100 should be allowed to pass first.

In addition, in cases where the multiple arbitration target vehicles have met, or are predicted to meet, at the converging point Jc, the control instruction unit 313 instructs the execution of at least one of the post-arbitration control and the pre-arbitration control, which can clarify which vehicle should be allowed to pass first at the point where the multiple routes converge.

The server 300 instructs each arbitration target vehicle on the control content determined using the priority, and each arbitration target vehicle runs according to the instructions from the server 300. Thus, there is no need for vehicles 100 to determine which vehicle 100 should run in preference to other vehicles 100, which can reduce the control complexity in the vehicles 100.

The priority setting unit 311 uses the standby information and the vehicle attribute information to set the priority, so that the vehicles 100 to be shipped by the loading vehicle 400 can be transported preferentially depending on the standby state of the loading vehicle 400, which can reduce the lead time for shipment by the loading vehicle 400.

The priority setting unit 311 further uses the loading capacity information to set the priority, which can reduce the situations where vehicles 100 in excess of the loading capacity of the loading vehicle 400 are transported and an excessive number of vehicles 100 is left waiting to be shipped.

The priority setting unit 311 sets an upper limit of the number of priority vehicles and sets the priority such that the number of priority vehicles is less than or equal to the upper limit, which can reduce delay in transporting vehicles other than the priority vehicles that may otherwise result from transporting the priority vehicles in excess of the loading capacity of the loading vehicle 400.

B. Second Embodiment

Figure 6:
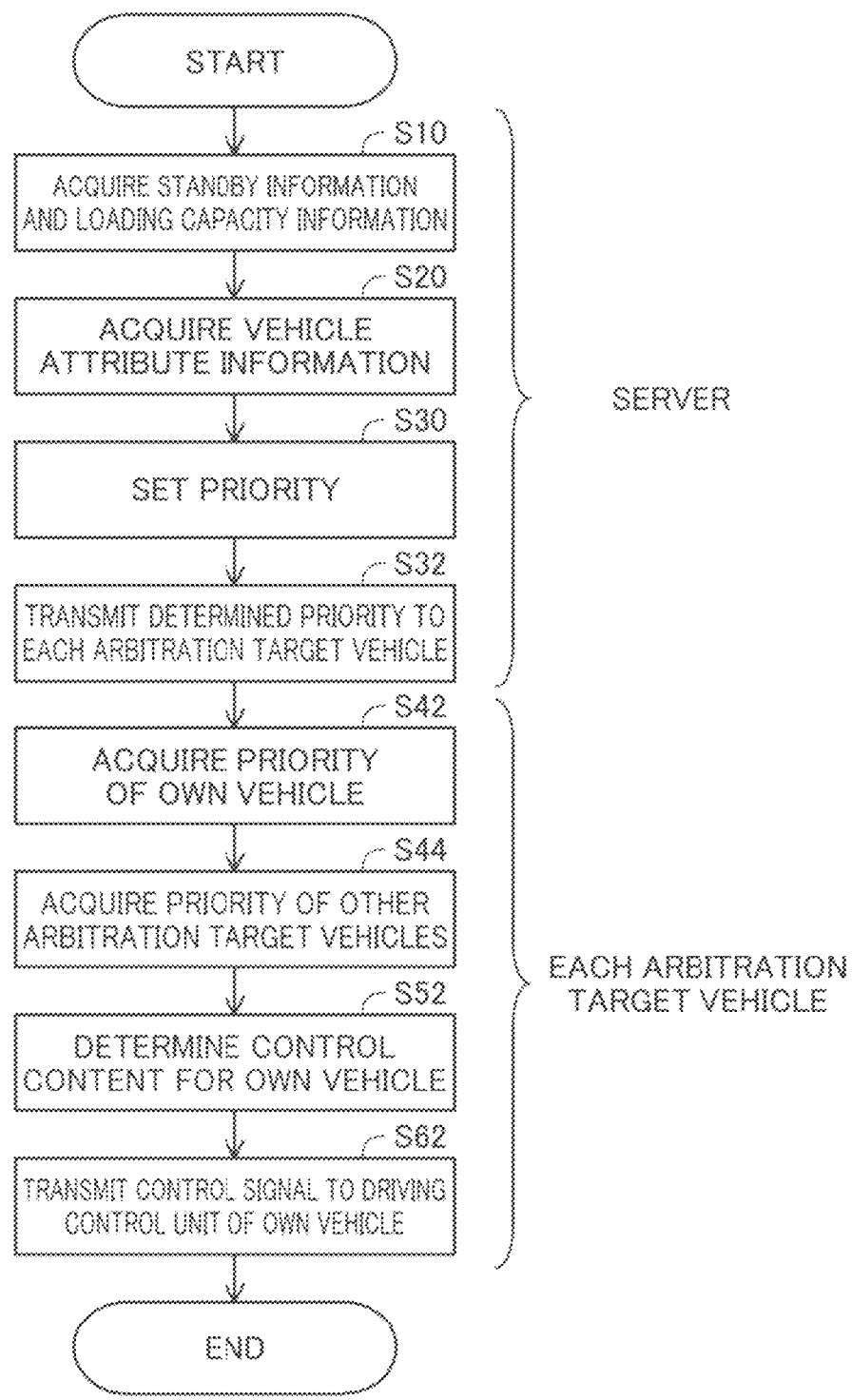
FIG. 6 is a flowchart of a procedure for transport arbitration control according to the second embodiment.

FIG. 5 illustrates a schematic configuration of an automatic driving system 500A according to a second embodiment. FIG. 6 is a flowchart of a procedure for transport arbitration control according to the second embodiment. The distinctions of the automatic driving system 500A of the second embodiment from the system configuration of the automatic driving system 500 of the first embodiment are that the automatic driving system 500A includes a server 300A instead of the server 300 and each vehicle 100 includes an ECU 180A instead of the ECU 180. A distinction of the transport arbitration control of the second embodiment from the transport arbitration control of the first embodiment is that in the transport arbitration control of the second embodiment, a control different from the transport arbitration control of the first embodiment is executed after completion of step S30. The other elements of the system configuration and the transport arbitration control of the automatic driving system 500A of the second embodiment are the same as the automatic driving system 500 of the first embodiment. Thus, like reference numerals are used to denote like components and like steps, and their detailed descriptions are omitted.

As shown in FIG. 5, the server 300A includes the priority setting unit 311 and does not include the priority acquisition unit 312 and the control instruction unit 313. In the present embodiment, the priority setting unit 311 sets the priority as in the first embodiment and transmits the set priority to each arbitration target vehicle.

In addition to the driving control unit 181, the ECU 180A functions as a priority acquisition unit 182 and a control instruction unit 183. The priority acquisition unit 182 acquires the priority of its own vehicle transmitted from the server 300A and also acquires the priority of each arbitration target vehicle from other arbitration target vehicles. The control instruction unit 183 determines the control content for its own vehicle using the priority acquired by the priority acquisition unit 182, and transmits a control signal indicating the determined control content to the driving control unit 181 of its own vehicle. In the following description, the priority acquisition unit 182 included in the arbitration target vehicle is also referred to as the "arbitration target's priority acquisition unit."

As shown in FIG. 6, in the transport arbitration control of the second embodiment, the control in steps S10 to S32 is executed by the server 300A, while the control in steps S42 to S62 is executed by each arbitration target vehicle. After setting the priority (step S30), the priority setting unit 311 transmits the set priority to each arbitration target vehicle in step S32. The method for setting the priority is the same as in the first embodiment described above.

In step S42, each arbitration target's priority acquisition unit acquires the priority of its own vehicle transmitted from the server 300A. In step S44, each arbitration target's priority acquisition unit acquires the priority of each arbitration target vehicle from other arbitration target vehicles. More specifically, in the present embodiment, the arbitration target vehicles acquire each other's priority via vehicle-to-vehicle communication with other arbitration target vehicles present within a predetermined range.

In step S52, the control instruction unit 183 determines the control content for its own vehicle using the priority acquired by the priority acquisition unit 182. More specifically, the control instruction unit 183 compares the priority of its own vehicle acquired from the server 300A with the priority of each arbitration target vehicle acquired from other arbitration target vehicles to determine the control content according to the higher or lower priority. The method for determining the control content is the same as in the first embodiment described above. In step S62, the control instruction unit 183 transmits a control signal indicating the determined control content to the driving control unit 181 of its own vehicle. The driving control unit 181 of each arbitration target vehicle executes the driving control of its own vehicle according to the instructions from the control instruction unit 183. This completes the transport arbitration control of the present embodiment.

In the automatic driving system 500A of the second embodiment described above, the control instruction unit 183 of each arbitration target vehicle determines the control content using the priority acquired from the server 300A. Thus, there is no need for the server 300A to determine the control content for each arbitration target vehicle, which can reduce the control complexity in the server 300A.

C. Third Embodiment

Figure 7:
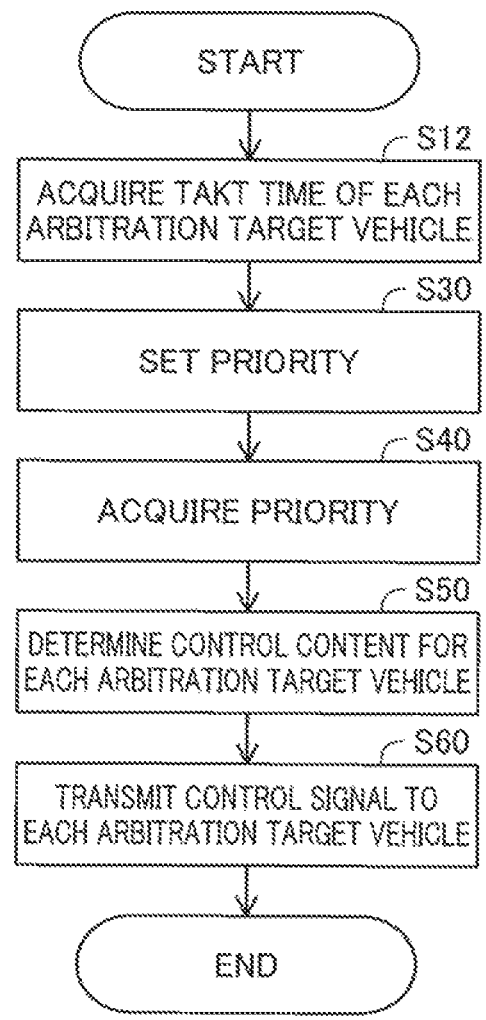
FIG. 7 is a flowchart of a procedure for transport arbitration control according to a third embodiment.

FIG. 7 is a flowchart of a procedure for transport arbitration control according to a third embodiment. The distinction of the automatic driving system 500 of the third embodiment from the automatic driving system 500A of the first embodiment is that the automatic driving system 500 of the third embodiment sets the priority using takt time of each arbitration target vehicle, instead of the standby information and the loading capacity information about the loading vehicle 400.

As shown in FIG. 7, the distinctions of the transport arbitration control of the third embodiment from the transport arbitration control of the first embodiment are that step S12 is performed instead of step S10, and step S20 is not performed. In the present embodiment, the server 300 executes the transport arbitration control when multiple vehicles 100 have met, or are predicted to meet, at the converging point Jc. The server 300 determines that multiple vehicles 100 have met at the converging point Jc, or predicts that multiple vehicles 100 will meet at the converging point Jc, through, for example, an analysis of images captured by the cameras 80. Alternatively, multiple vehicles 100 may acquire their positional relationships with each other through vehicle-to-vehicle communication, and each vehicle 100 may notify the server 300 of the fact that it has met, or is predicted to meet, another vehicle 100 at the converging point Jc.

In step S12, the priority setting unit 311 acquires the takt time of each arbitration target vehicle from the step management device for the pre-step 50. The term "takt time" refers to a parameter that is set according to the status of production of the vehicles 100 as the target time required to transport each vehicle 100. The takt time corresponds to "information about a current status of production of the plurality of vehicles" in the present disclosure.

In step S30, the priority setting unit 311 sets the priority such that arbitration target vehicles with a shorter takt time are transported preferentially.

In the automatic driving system 500 of the third embodiment described above, the priority setting unit 311 sets the priority such that the vehicles 100 with a shorter takt time are shipped preferentially. As such, the vehicles 100 with a shorter takt time and with less time left for transport can be transported preferentially, which can reduce delay in shipment of the vehicles 100 that may otherwise be caused by transport delay.

D. Fourth Embodiment

Figure 8:
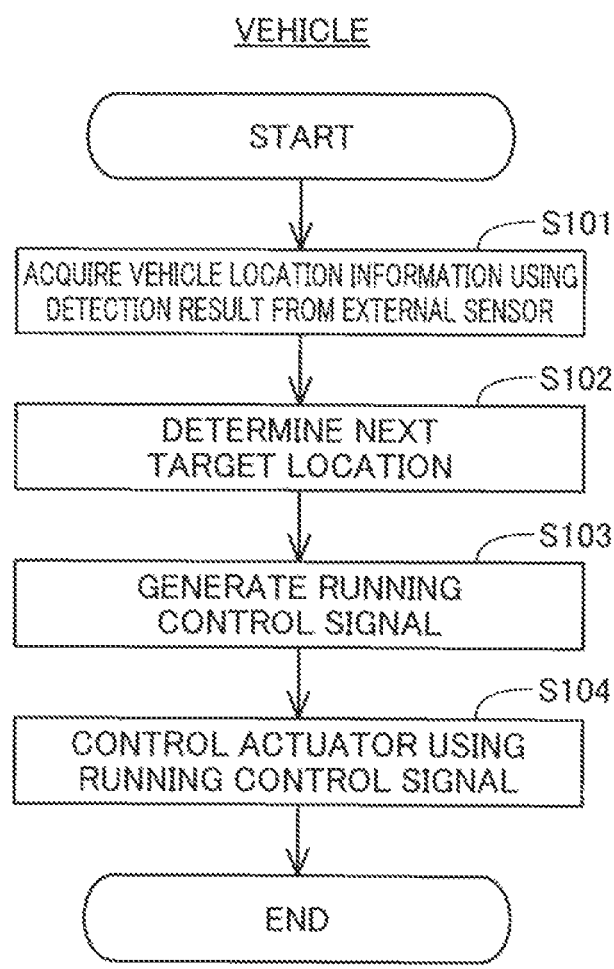
FIG. 8 is a flowchart of a processing procedure for running control of a vehicle according to a fourth embodiment.

FIG. 8 is a flowchart showing a processing procedure for running control of the vehicle 100 in the fourth embodiment. Since the configuration of the vehicle 100 in the present embodiment is the same as in the first embodiment, the vehicle in the present embodiment is denoted as vehicle 100 for convenience. In step S101, the vehicle 100 acquires vehicle location information using detection result output from the camera 80 as an external sensor. In step S102, the vehicle 100 determines a target location to which the vehicle 100 is to move next. In step S103, the vehicle 100 generates a running control signal for causing the vehicle 100 to run to the determined target location. In step S104, the vehicle 100 controls an actuator using the generated running control signal, thereby causing the vehicle 100 to run by following a parameter indicated by the running control signal. The vehicle 100 repeats the acquisition of vehicle location information, the determination of a target location, the generation of a running control signal, and the control over the actuator in a predetermined cycle. According to the automatic driving system 500 in the present embodiment, it is possible to cause the vehicle 100 to run by autonomous control without controlling the vehicle 100 remotely using the server 300.

E. Other Embodiments (E1) In the above embodiments, the control instruction unit 313 can instruct the execution of both of the pre-arbitration control and the post-arbitration control as the control content. However, the present disclosure is not limited to such embodiments. The control instruction unit 313 may instruct the execution of only one of the pre-arbitration control and the post-arbitration control as the control content. Such a configuration provides the same effects as the above embodiments.

(E2) In the above embodiments, multiple arbitration target vehicles run along multiple different tracks, as shown in FIG. 4. However, the present disclosure is not limited to such embodiments. Multiple arbitration target vehicles may run on a single track. With such a configuration, for example, a station for the vehicles 100 may be provided at the side of the track RT, and the control instruction unit 313 may determine the control content for each arbitration target vehicle such that vehicles 100 with a lower priority are stopped at the station and the vehicles 100 with a higher priority are preferentially allowed to run. Such a configuration provides the same effects as the above embodiments.

(E3) In the above embodiments, the server 300 or the server 300A includes the priority setting unit 311. However, the present disclosure is not limited to such embodiments. The server 300 or the server 300A may not include the priority setting unit 311, and may only store a predetermined priority of each vehicle 100 in the storage device 320. With such a configuration, in the first embodiment, the priority acquisition unit 312 acquires the priority from the storage device 320. In the second embodiment, the arbitration target's priority acquisition unit acquires the priority from the storage device 320. Such a configuration eliminates the need for the server 300 or the server 300A to set the priority, reducing the control complexity in the server 300 or the server 300A.

(E4) In the above first and second embodiments, the loading vehicle 400 transmits the standby information and the loading capacity information to the server 300 or the server 300A. However, the present disclosure is not limited to such embodiments. For example, the automatic driving system 500 may further include a management system that manages the loading condition of the loading vehicle 400 by, for example, capturing images of vehicles 100 parked at a waiting place to wait for loading onto the loading vehicle 400 as well as the loading bed of the loading vehicle 400, and the management system may transmit the standby information and the loading capacity information to the server 300 or the server 300A. Such a configuration provides the same effects as the above embodiments.

(E5) In the above first and second embodiments, the loading vehicle 400 transmits the standby information and the loading capacity information to the server 300 or the server 300A. However, the present disclosure is not limited to such embodiments. The loading vehicle 400 may only transmit the standby information to the server 300 or the server 300A, and the priority setting unit 311 may set the priority only using the standby information. For example, in response to receiving, as the standby information, information indicating that the loading vehicle 400 transporting vehicles 100 with the vehicle attribute A is on standby, the priority setting unit 311 may set a higher priority for all arbitration target vehicles with the vehicle attribute A over the other arbitration target vehicles. Such a configuration, too, allows the vehicles 100 shipped by the loading vehicle 400 to be transported preferentially depending on the standby state of the loading vehicle 400, which can reduce the lead time for shipment by the loading vehicle 400.

(E6) In the above first and second embodiments, the priority setting unit 311 acquires the standby information and the loading capacity information transmitted from the loading vehicle 400. However, the present disclosure is not limited to such embodiments. The priority setting unit 311 may not to acquire the standby information and the loading capacity information from the loading vehicle 400. For example, the priority setting unit 311 may pre-store an operation plan of the loading vehicle 400 in the memory device 320 and set the priority such that the loading vehicle 400 transports the vehicles 100 according to the operation plan even if the loading vehicle 400 has not been on standby. Such a configuration allows for setting the priority without communicating with the loading vehicle 400, which can reduce the control complexity in the server 300 or the server 300A.

(E7) In the above first and second embodiments, the priority setting unit 311 uses the vehicle attribute information to set the priority. However, the present disclosure is not limited to such embodiments. The priority setting unit 311 may set the priority using the vehicle identification information stored in the storage device 320 as information indicating a particular vehicle 100, such as ID information set for each vehicle 100. Such a configuration provides the same effects as the above embodiments.

(E8) In the above second embodiment, each vehicle 100 includes the priority acquisition unit 182 and the control instruction unit 183 in addition to the driving control unit 181. However, the present disclosure is not limited to such an embodiment. Some of the multiple vehicles 100 may include the priority acquisition unit 182 and control instruction unit 183. With such a configuration, the control equivalent to the pre-arbitration control and the post-arbitration control described above may be implemented by causing vehicles 100 of the multiple vehicles 100 without the priority acquisition unit 182 and the control instruction unit 183 to run at a predetermined constant speed while causing those with the priority acquisition unit 182 and the control instruction unit 183 to speed up or slow down. Such a configuration can reduce the control complexity in some of the multiple vehicles 100.

(E9) In the above second embodiment, each arbitration target's priority acquisition unit acquires the priority of its own vehicle from the server 300A and acquires the priority of each arbitration target vehicle from other arbitration target vehicles. However, the present disclosure is not limited to such an embodiment. Each arbitration target's priority acquisition unit may acquire the priority of all arbitration target vehicles from the server 300A. Such a configuration allows each arbitration target's priority acquisition unit to determine the control content without vehicle-to-vehicle communication, which can reduce the control complexity in each vehicle 100.

(E10) In the above second embodiment, each arbitration target's priority acquisition unit acquires the priority of its own vehicle from the server 300A. However, the present disclosure is not limited to such an embodiment. Each vehicle may store its own predetermined priority in its own memory, and the arbitration target's priority acquisition unit may acquire the priority of its own vehicle from the memory of the own vehicle. For example, based on the vehicle type, a highest priority may be predetermined for urgent vehicles of which the shipment is urgently required, a lowest priority for logistics carts, and a medium priority for mass production vehicles. Such a configuration allows each vehicle 100 to determine its own control content without communicating with the server 300A, which can reduce the control complexity in each vehicle 100.

(E11) In the above third embodiment, the priority setting unit 311 acquires only the takt time of each arbitration target vehicle to set the priority. However, the present disclosure is not limited to such an embodiment. The priority setting unit 311 may acquire information about the current status of production or shipment of the vehicle 100, e.g., information indicating factors (1) to (6) listed below, to set the priority. Of the following factors (1) to (6), the factors (1), (3), and (6) correspond to the "information about a current status of shipment of the plurality of vehicles" in the present disclosure. The factors (2), (4), and (5) correspond to the "information about a current status of production of the plurality of vehicles" in the present disclosure. In other words, the factors (1) to (6) correspond to the "information about a current status of production or shipment of the plurality of vehicles" in the present disclosure.

(1) Distance from the factory FC to the shipping destination
(2) Takt time
(3) Shipment deadline
(4) Degree of delay or progress in production
(5) Type of mounting parts and their presence/absence in the post-step
(6) Degree of congestion on roads from the factory FC to the shipping destination For example, the priority setting unit 311 may refer to the manufacturing information to acquire the information indicating the factors (1) to (6) and calculate a score corresponding to each of the factors (1) to (6), and set the priority according to how high or low the total value obtained by adding these scores is. Such a configuration allows the priority setting unit 311 to set the priority using the information about the current status of production or shipment of the multiple vehicles 100, which allows for an appropriate priority setting according to the current status of production or shipment, resulting in more efficient transport of the multiple vehicles 100.

(E12) In the above embodiments, the server 300 or the server 300A includes the priority setting unit 311. However, the present disclosure is not limited to such embodiments. The server 300 or the server 300A may not include the priority setting unit 311, and the vehicle 100 may include a priority setting unit. With such a configuration, the priority setting unit in the vehicle 100 may acquire the information about the current status of production or shipment of multiple vehicles 100 via the communication unit 190 and set the priority.

(E13) In each of the above-described embodiments, the vehicle detector (the external sensor) is not limited to the camera 80 but may be the distance measuring device, for example. The distance measuring device is a light detection and ranging (LIDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(E14) In the above-described first to second embodiments, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator of the vehicle 100 using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(E15) In the above-described fourth embodiment, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(E16) In the above-described fourth embodiment, the vehicle 100 acquires vehicle location information using detection result from the external sensor. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control an actuator of the vehicle 100 using the generated running control signal. In this case, the vehicle 100 is capable of running without using any detection result from an external sensor. The vehicle 100 may acquire target arrival time or traffic congestion information from outside the vehicle 100 and reflect the target arrival time or traffic congestion information in at least one of the route and the running control signal. The functional configuration of the automatic driving system 500 may be entirely provided at the vehicle 100. Specifically, the processes realized by the automatic driving system 500 in the present disclosure may be realized by the vehicle 100 alone.

(E17) In the above-described first to third embodiments, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device. Note that the driving of the vehicle 100 by such control is referred to as "unmanned driving." In the above configuration, information indicating the determined priority may be displayed on a display of the operating device (remote cockpit). The "information indicating the priority" may be, for example, information specifying that "the own vehicle is prioritized over other vehicles" and "the own vehicle is not prioritized over other vehicles." When the priority is changed, information indicating the changed priority may be displayed on the above display. Further, when the priority is changed, the unmanned driving may be terminated and the remote automatic driving may be initiated to enable the running according to the changed priority.

(E18) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first and the second embodiments.

(E19) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(E20) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The present disclosure is not limited to the above embodiments and may be implemented in various different ways without departing from the scope of the disclosure. For example, the technical features in the embodiments corresponding to those in the aspects described in the SUMMARY section above may be replaced or combined as appropriate in order to address partially or wholly the aforementioned problems or to achieve some or all of the aforementioned advantageous effects. Any of the technical features, unless being described as essential herein, may be omitted as appropriate. For example, the present disclosure may be implemented in the following aspects.

(1) According to one aspect of the present disclosure, an automatic driving system is provided. The automatic driving system is an automatic driving system for controlling transport of each of a plurality of vehicles in any of steps from production to shipment and comprises: a priority acquisition unit configured to acquire a shipment priority that is set for each of the plurality of vehicles; and a control instruction unit configured to determine control content for at least some of the plurality of vehicles using the priority acquired by the priority acquisition unit such that a vehicle of the plurality of vehicles that is given a first priority as the priority is transported in preference to another vehicle of the plurality of vehicles that is given a second priority as the priority, the second priority being lower than the first priority, and to instruct the at least some of the plurality of vehicles on the control content. Each of the plurality of vehicles includes a driving control unit configured to execute driving control of the vehicle according to instructions from the control instruction unit.

The automatic driving system of this aspect uses the priority to determine control content for at least some of the multiple vehicles such that a higher prioritized vehicle of the multiple vehicles is transported preferentially, and instructs these at least some vehicles on the control content. This can clarify which of the multiple vehicles should be allowed to pass first.

(2) In the above aspect, the control instruction unit may be configured to instruct execution of at least one of the following controls as the control content: (i) post-arbitration control that, in response to a plurality of arbitration target vehicles, which are a plurality of the vehicles running along a plurality of different tracks, meeting at a converging point of the plurality of tracks, allows one of the plurality of arbitration target vehicles that is given the first priority to pass through the converging point in preference to another one of the plurality of arbitration target vehicles that is given the second priority; and (ii) pre-arbitration control that, in response to the plurality of arbitration target vehicles being predicted to meet at the converging point, executes at least one of control to increase a vehicle speed of one of the plurality of arbitration target vehicles that is given the first priority and control to reduce a vehicle speed of another one of the plurality of arbitration target vehicles that is given the second priority.

In the automatic driving system of this aspect, in cases where the multiple arbitration target vehicles have met, or are predicted to meet, at the converging point, the control instruction unit instructs the execution of at least one of the post-arbitration control and the pre-arbitration control, which can clarify which vehicle should be allowed to pass first at the point where the multiple routes converge.

(3) In the above aspect, the automatic driving system may further comprise a server configured to communicate remotely with the plurality of vehicles, the server including the priority acquisition unit and the control instruction unit.

In the automatic driving system of this aspect, the server instructs each arbitration target vehicle on the control content determined using the priority, and each arbitration target vehicle runs according to the instructions from the server. Thus, there is no need for vehicles to determine which vehicle should run in preference to other vehicles, which can reduce the control complexity in the vehicles.

(4) In the above aspect, the automatic driving system may further comprise a server configured to communicate remotely with the plurality of vehicles, the server being configured to manage the priority. At least some of the plurality of vehicles may include the priority acquisition unit and the control instruction unit. The priority acquisition unit may be configured to execute: acquiring, from the server, the priority of an own vehicle provided with the priority acquisition unit; and acquiring, from another vehicle of the plurality of vehicles different from the own vehicle, the priority of the another vehicle, and the control instruction unit may be configured to determine the control content for the own vehicle using the priority of the own vehicle and the priority of the another vehicle and to instruct the driving control unit of the own vehicle on the control content.

In the automatic driving system of this aspect, the control instruction unit included in at least some of the multiple vehicles determines the control content for its own vehicle using the priority acquired from the server and other vehicles. Thus, there is no need for the server to determine the control content for each arbitration target vehicle, which can reduce the control complexity in the server.

(5) In the above aspect, the automatic driving system may further comprise a priority setting unit configured to acquire information about a current status of production or shipment of the plurality of vehicles and to set the priority using the information. The priority acquisition unit may be configured to acquire the priority set by the priority setting unit.

In the automatic driving system of this aspect, the priority setting unit sets the priority using the information about the current status of production or shipment of the multiple vehicles, which allows for an appropriate priority setting according to the current status of production or shipment.

(6) In the above aspect, the priority setting unit may be configured to acquire, as information about a current status of production of the plurality of vehicles, a takt time that is set according to a status of production of each of the plurality of vehicles as a target time required for transporting each of the plurality of vehicles, and to set the priority such that a vehicle that is given a first takt time as the takt time is shipped in preference to another vehicle that is given a second takt time as the takt time, the second takt time being longer than the first takt time.

In the automatic driving system of this aspect, the priority setting unit sets the priority such that vehicles with a shorter takt time are shipped preferentially. As such, the vehicles with a shorter takt time and with less time left for transport can be transported preferentially, which can reduce delay in shipment of the vehicles that may otherwise be caused by transport delay.

(7) In the above aspect, the priority setting unit may be configured to acquire, as information about a current status of shipment of the plurality of vehicles, standby information that indicates whether or not a loading vehicle carrying a vehicle of the plurality of vehicles with predetermined vehicle identification information is on standby, and the vehicle identification information that is predetermined for each of the plurality of vehicles, and to set the priority using the standby information and the vehicle identification information.

In the automatic driving system of this aspect, the priority setting unit uses the standby information and the vehicle attribute information to set the priority, so that the vehicles to be shipped by the loading vehicle can be transported preferentially depending on the standby state of the loading vehicle, which can reduce the lead time for shipment by the loading vehicle.

(8) In the above aspect, the priority setting unit may be configured to further acquire, as information about a current status of shipment of the plurality of vehicles, loading capacity information that indicates a loading capacity of the loading vehicle, and to set the priority using the standby information, the loading capacity information, and the vehicle identification information.

In the automatic driving system of this aspect, the priority setting unit further uses the loading capacity information to set the priority, which can reduce the situations where vehicles in excess of the loading capacity of the loading vehicle are transported and an excessive number of vehicles is left waiting to be shipped.

(9) In the above aspect, the priority setting unit may be configured to set an upper limit of a number of priority vehicles using the loading capacity information and the vehicle identification information, the priority vehicles each being one of the plurality of vehicles that is to be given the higher priority over others of the plurality of vehicles, and to set the priority such that the number of priority vehicles is less than or equal to the upper limit.

In the automatic driving system of this aspect, the priority setting unit sets an upper limit of the number of priority vehicles and sets the priority such that the number of priority vehicles is less than or equal to the upper limit, which can reduce delay in transporting vehicles other than the priority vehicles that may otherwise result from transporting the priority vehicles in excess of the loading capacity of the loading vehicle.

(10) According to one aspect of the present disclosure, a server is provided. The server is a server used to control transport of each of a plurality of vehicles in any of steps from production to shipment and comprises: a priority acquisition unit configured to acquire a shipment priority that is set for each of the plurality of vehicles; and a control instruction unit configured to determine control content for at least some of the plurality of vehicles using the priority acquired by the priority acquisition unit such that a vehicle of the plurality of vehicles that is given a first priority as the priority is transported in preference to another vehicle of the plurality of vehicles that is given a second priority as the priority, the second priority being lower than the first priority, and to instruct the at least some of the plurality of vehicles on the control content. Each of the plurality of vehicles includes a driving control unit configured to execute driving control of the vehicle according to instructions from the control instruction unit.

The server of this aspect uses the priority to determine control content for at least some of the multiple vehicles such that a higher prioritized vehicle of the multiple vehicles is transported preferentially, and instructs these at least some vehicles on the control content. This can clarify which of the multiple vehicles should be allowed to pass first.

(11) According to one aspect of the present disclosure, a vehicle is provided. The vehicle comprises: an information acquisition unit configured to acquire information from outside the vehicle; and a driving control unit configured to execute driving control of the vehicle using the information such that, according to a priority that is set for the vehicle and indicates which of a plurality of vehicles including the vehicle is to be shipped preferentially, a vehicle of the plurality of vehicles that is given a first priority as the priority is transported in preference to another vehicle of the plurality of vehicles that is given a second priority as the priority, the second priority being lower than the first priority.

The vehicle of this aspect includes the driving control unit configured to execute the driving control of the vehicle such that, according to the priority, a higher prioritized vehicle of the multiple vehicles is transported preferentially. This can clarify which of the multiple vehicles should be allowed to pass first.

What is claimed is:

1. An automatic driving system for controlling transport of each of a plurality of vehicles in any of steps from production to shipment, comprising:
    a priority acquisition unit configured to acquire a shipment priority that is set for each of the plurality of vehicles;
    a control instruction unit configured to determine control content for at least some of the plurality of vehicles using the priority acquired by the priority acquisition unit such that a vehicle of the plurality of vehicles that is given a first priority as the priority is transported in preference to another vehicle of the plurality of vehicles that is given a second priority as the priority, the second priority being lower than the first priority, and to instruct the at least some of the plurality of vehicles on the control content; and
    a priority setting unit configured to acquire information about a current status of production or shipment of the plurality of vehicles and to set the priority using the information, wherein
    each of the plurality of vehicles includes a driving control unit configured to execute driving control of the vehicle according to instructions from the control instruction unit,
    the priority acquisition unit is configured to acquire the priority set by the priority setting unit, and
    the priority setting unit is configured to acquire, as information about a current status of production of the plurality of vehicles, a takt time that is set according to a status of production of each of the plurality of vehicles as a target time required for transporting each of the plurality of vehicles, and to set the priority such that a vehicle that is given a first takt time as the takt time is shipped in preference to another vehicle that is given a second takt time as the takt time, the second takt time being longer than the first takt time.

2. The automatic driving system according to claim 1, wherein
    the control instruction unit is configured to instruct execution of at least one of the following controls as the control content:
    (i) post-arbitration control that, in response to a plurality of arbitration target vehicles, which are a plurality of the vehicles running along a plurality of different tracks, meeting at a converging point of the plurality of tracks, allows one of the plurality of arbitration target vehicles that is given the first priority to pass through the converging point in preference to another one of the plurality of arbitration target vehicles that is given the second priority; and (ii) pre-arbitration control that, in response to the plurality of arbitration target vehicles being predicted to meet at the converging point, executes at least one of control to increase a vehicle speed of one of the plurality of arbitration target vehicles that is given the first priority and control to reduce a vehicle speed of another one of the plurality of arbitration target vehicles that is given the second priority.

3. The automatic driving system according to claim 1, further comprising a server configured to communicate remotely with the plurality of vehicles, the server including the priority acquisition unit and the control instruction unit.

4. The automatic driving system according to claim 1, further comprising a server configured to communicate remotely with the plurality of vehicles, the server being configured to manage the priority, wherein at least some of the plurality of vehicles include the priority acquisition unit and the control instruction unit,
the priority acquisition unit is configured to execute:
 acquiring, from the server, the priority of an own vehicle provided with the priority acquisition unit; and
 acquiring, from another vehicle of the plurality of vehicles different from the own vehicle, the priority of the another vehicle, and
the control instruction unit is configured to determine the control content for the own vehicle using the priority of the own vehicle and the priority of the another vehicle and to instruct the driving control unit of the own vehicle on the control content.

5. An automatic driving system for controlling transport of each of a plurality of vehicles in any of steps from production to shipment, comprising:

a priority acquisition unit configured to acquire a shipment priority that is set for each of the plurality of vehicles;
a control instruction unit configured to determine control content for at least some of the plurality of vehicles using the priority acquired by the priority acquisition unit such that a vehicle of the plurality of vehicles that is given a first priority as the priority is transported in preference to another vehicle of the plurality of vehicles that is given a second priority as the priority, the second priority being lower than the first priority, and to instruct the at least some of the plurality of vehicles on the control content; and
a priority setting unit configured to acquire information about a current status of production or shipment of the plurality of vehicles and to set the priority using the information, wherein
each of the plurality of vehicles includes a driving control unit configured to execute driving control of the vehicle according to instructions from the control instruction unit,
the priority acquisition unit is configured to acquire the priority set by the priority setting unit, and
the priority setting unit is configured to acquire, as information about a current status of shipment of the plurality of vehicles, standby information that indicates whether or not a loading vehicle carrying a vehicle of the plurality of vehicles with predetermined vehicle identification information is on standby, and the vehicle identification information that is predetermined for each of the plurality of vehicles, and to set the priority using the standby information and the vehicle identification information.

6. The automatic driving system according to claim 5, wherein the priority setting unit is configured to further acquire, as information about a current status of shipment of the plurality of vehicles, loading capacity information that indicates a loading capacity of the loading vehicle, and to set the priority using the standby information, the loading capacity information, and the vehicle identification information.

7. The automatic driving system according to claim 6, wherein the priority setting unit is configured to set an upper limit of a number of priority vehicles using the loading capacity information and the vehicle identification information, the priority vehicles each being one of the plurality of vehicles that is to be given the higher priority over others of the plurality of vehicles, and to set the priority such that the number of priority vehicles is less than or equal to the upper limit.

* * * * *